(12) United States Patent
Koyama et al.

(10) Patent No.: US 10,921,550 B2
(45) Date of Patent: Feb. 16, 2021

(54) LENS DEVICE, CAMERA DEVICE, AND MOVING BODY

(71) Applicant: SZ DJI TECHNOLOGY CO., LTD., Shenzhen (CN)

(72) Inventors: Takashi Koyama, Shenzhen (CN); Kenichi Honjo, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/723,483

(22) Filed: Dec. 20, 2019

(65) Prior Publication Data

US 2020/0124822 A1    Apr. 23, 2020

Related U.S. Application Data

(63) Continuation of application No. PCT/CN2018/115264, filed on Nov. 13, 2018.

(30) Foreign Application Priority Data

Nov. 17, 2017    (JP) .............................. JP2017-222188

(51) Int. Cl.
   *G02B 7/10*     (2006.01)
   *G03B 17/12*    (2021.01)
   *H04N 5/225*    (2006.01)

(52) U.S. Cl.
   CPC .............. *G02B 7/102* (2013.01); *G03B 17/12* (2013.01); *H04N 5/2254* (2013.01)

(58) Field of Classification Search
   USPC ........................................ 396/73, 75, 79, 85
   See application file for complete search history.

(56) References Cited

U.S. PATENT DOCUMENTS

| 4,616,913 A | | 10/1986 | Suzuki et al. | |
| 5,016,993 A | * | 5/1991 | Akitake | G02B 7/102 |
| | | | | 359/696 |
| 5,287,137 A | * | 2/1994 | Hara | G02B 7/102 |
| | | | | 355/61 |

(Continued)

FOREIGN PATENT DOCUMENTS

| CN | 1573398 A | 2/2005 |
| CN | 1797058 A | 7/2006 |

(Continued)

OTHER PUBLICATIONS

The World Intellectual Property Organization (WIPO) International Search Report for PCT/CN2018/115264 dated Jan. 30, 2019 7 Pages (including translation).

*Primary Examiner* — Rodney E Fuller
(74) *Attorney, Agent, or Firm* — Anova Law Group, PLLC

(57) ABSTRACT

A lens device includes a first motor, a second motor, a lens, a cam ring, and a gear part. The cam ring is configured to, in cooperation with the first motor and the second motor, drive the lens to move in a direction along an optical axis of the lens. The gear part is configured to transmit a power of both the first motor and the second motor to the cam ring. The gear part includes a first gear connected to a first shaft of the first motor, a second gear connected to a second drive shaft of the second motor, and a third gear that meshes with the first gear and the second gear. The power of the first motor and the second motor is transmitted to the cam ring via the third gear.

18 Claims, 6 Drawing Sheets

(56) References Cited

U.S. PATENT DOCUMENTS

| | | | | |
|---|---|---|---|---|
| 6,927,921 | B2* | 8/2005 | Yano | G02B 7/102 359/696 |
| 2005/0018319 | A1* | 1/2005 | Yano | G02B 7/102 359/819 |
| 2006/0115250 | A1* | 6/2006 | Nomura | G02B 7/102 396/55 |
| 2006/0115251 | A1* | 6/2006 | Nomura | G02B 7/023 396/55 |
| 2006/0115253 | A1* | 6/2006 | Nomura | G02B 7/102 396/55 |
| 2006/0115255 | A1* | 6/2006 | Nomura | G03B 17/04 396/55 |
| 2006/0115257 | A1* | 6/2006 | Nomura | H04N 5/23287 396/55 |
| 2011/0286110 | A1* | 11/2011 | Ota | G03B 3/10 359/694 |
| 2011/0292523 | A1* | 12/2011 | Uehara | G02B 7/1805 359/699 |
| 2012/0188660 | A1* | 7/2012 | Fahlbusch | G02B 21/02 359/824 |
| 2015/0381858 | A1* | 12/2015 | Sterngren | F16M 11/105 348/143 |
| 2016/0054540 | A1* | 2/2016 | Kogure | G02B 7/026 359/824 |

FOREIGN PATENT DOCUMENTS

| | | | |
|---|---|---|---|
| CN | 1971330 | A | 5/2007 |
| CN | 102314049 | A | 1/2012 |
| CN | 102401970 | A | 4/2012 |
| CN | 103389557 | A | 11/2013 |
| CN | 104793313 | A | 7/2015 |
| CN | 204515217 | U * | 7/2015 |
| CN | 204515217 | U | 7/2015 |
| CN | 205899224 | U | 1/2017 |
| JP | S59165977 | A | 9/1984 |
| JP | 2598758 | Y2 | 11/1991 |
| JP | H07287274 | A | 10/1995 |
| JP | H089602 | A | 1/1996 |
| JP | 2003202486 | A | 7/2003 |
| JP | 2007241000 | A | 9/2007 |
| JP | 2016027376 | A | 2/2016 |
| JP | 2016157037 | A | 9/2016 |
| JP | 2017151458 | A | 8/2017 |

* cited by examiner

LENS DEVICE, CAMERA DEVICE, AND MOVING BODY

CROSS-REFERENCES TO RELATED APPLICATION

This application is a continuation of International Application No. PCT/CN2018/115264, filed Nov. 13, 2018, which claims priority to Japanese Application No. 2017-222188, filed Nov. 17, 2017, and the entire contents of both of which are incorporated herein by reference.

TECHNICAL FIELD

The present disclosure generally relates to the field of mobile photography and, more particularly, relates to a lens device, a camera device, and a moving body.

BACKGROUND

A camera apparatus, such as television camera, movie camera, motion camera, flight camera, and other camera that takes images and/or videos, usually includes a driving device that is used to drive a zoom lens to change the magnification of the subject image by adjusting the focal length and also drive a focusing lens to obtain a clear image on the imaging device, such as charge-coupled device (CCD), in the camera apparatus. However, as the focusing lens, the zoom lens, or other lens in a camera apparatus becomes relatively heavy, the speed for driving the lens may become slow.

SUMMARY

One aspect of the present disclosure provides a lens device. The lens device includes a first motor and a second motor; a lens; and a cam ring. The cam ring is configured to, in cooperation with the first motor and the second motor, drive the lens move in a direction along an optical axis of the lens. The lens device also includes a gear part, configured to transmit power of the first motor and the second motor to the cam ring.

Another aspect of the present disclosure provides a camera device. The camera device includes a lens device and a camera part. The lens device includes a first motor and a second motor; a lens; and a cam ring. The cam ring is configured to, in cooperation with the first motor and the second motor, drive the lens move in a direction along an optical axis of the lens. The lens device also includes a gear part, configured to transmit power of the first motor and the second motor to the cam ring. The camera part is configured to take an image for light imaged by the lens device.

Other aspects of the present disclosure can be understood by those skilled in the art in light of the description, the claims, and the drawings of the present disclosure.

BRIEF DESCRIPTION OF THE DRAWINGS

In order to more clearly illustrate the technical solutions in the embodiments of the present disclosure, the drawings that need to be used in the description of the embodiments will be briefly described below. It is obvious that the drawings in the following description are some embodiments of the present disclosure, and for those of ordinary skill in the art, other drawings may also be obtained according to these drawings without any creative effort.

DETAILED DESCRIPTION OF THE EMBODIMENTS

In the following, the technical solutions in the embodiments of the present disclosure will be illustrated in detail with reference to the accompanying drawings. It should be understood that not all of the combinations of features illustrated in the embodiments are essential to the solution of the present disclosure. In addition, it should also be understood that the described embodiments are only a part of the embodiments of the present invention, but not all of the embodiments. All other embodiments obtained by those skilled in the art based on the embodiments of the present disclosure without creative efforts are within the scope of the present disclosure.

The claims, the description, the drawings, and the abstract of the present disclosure contain matters protected by copyright. Copying these contents as shown in the documents or records of the Patent Office will not be objected by the copyright owner. However, in other cases, all copyrights are reserved.

It should be noted that when a component is referred to as being "fixed" to another component, it can be directly on the other component or an intermediate component may be present. When a component is considered as "connected to" another component, it can be directly connected to another component or both connected to an intermediate component.

All technical and scientific terms used herein have the same meaning as commonly understood by one of ordinary skill in the art to which this disclosure belongs, unless otherwise defined. The terminology used in the description of the present disclosure is for the purpose of describing particular embodiments and is not intended to limit the disclosure. The term "and/or" used herein includes any and all combinations of one or more of the associated listed items.

Figure 1:
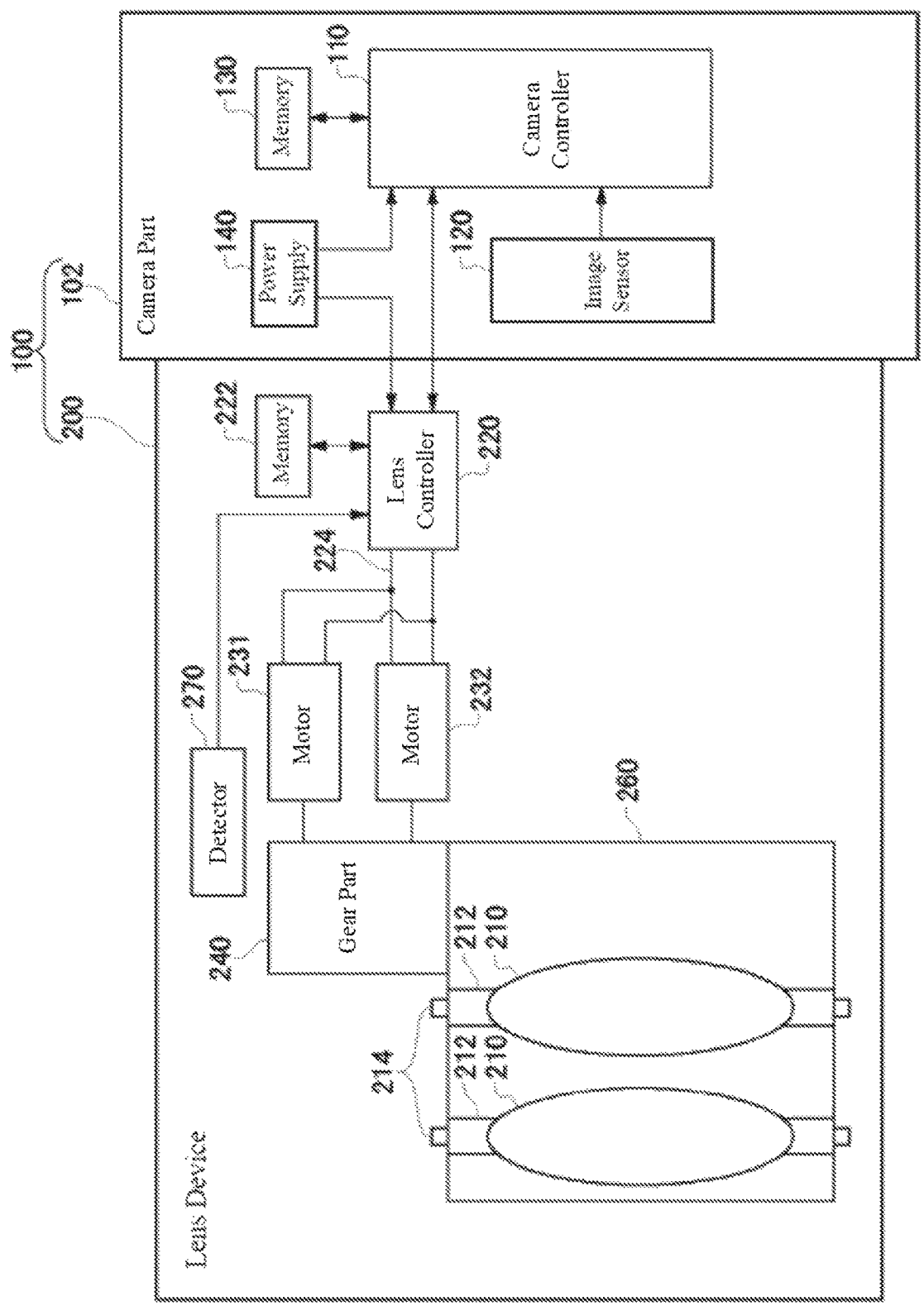
FIG. 1 illustrates a schematic diagram of various functional blocks of an exemplary camera device according to an embodiment of the present disclosure.

In existing camera devices, when the weight of a lens, such as a zoom lens, a focusing lens, etc., is large, the speed for driving the lens may also be slow. In order to solve the problem, the present disclosure provides a lens device. FIG. 1 illustrates a schematic diagram of various functional blocks of an exemplary camera device according to an embodiment of the present disclosure.

Referring to FIG. 1, the camera device 100 may include a lens device 200 and a camera part 102. The camera part 102 may include an image sensor 120, a camera controller 110, a memory 130, and a power supply 140. The lens device 200 may include a plurality of lenses 210, a plurality of lens holding frames 212, a lens controller 220, a memory 222, a motor 231, a motor 232, a gear part 240, a cam ring 260, and a detector 270.

The image sensor 120 may be a charge-coupled device (CCDs) sensor or a complementary metal-oxide-semiconductor (CMOS) sensor. The image sensor 120 may output image data of an optical image formed through the plurality of lenses 210 to the camera controller 110. The camera controller 110 may be composed of a microprocessor, such as a central processing unit (CPU) or a microprocessor unit (MPU), and a microcontroller, such as a microcontroller unit (MCU). The camera controller 110 may be able to control the camera device 100 according to an operation command issued from a user to the camera device 100 via an operation unit. The memory 130 may be a computer readable recording medium including at least one flash memory, such as static random access memory (SRAM), dynamic random access memory (DRAM), erasable programmable read only memory (EPROM), electrically-erasable programmable read only memory (EEPROM), universal serial bus (USB) memory, etc. The memory 130 may store programs that are necessary for the camera controller to control the image sensor 120 and other components. The memory 130 may be disposed inside the case of the camera device 100. The memory may be detachable from the case of the camera device 100. The power supply 140 may provide electric power to the camera part 102 and the lens device 200, respectively. In one embodiment, the power supply 140 may be a battery.

In one embodiment, the lens device 200 may be an interchangeable lens that is detachably disposed on the camera part 102. The lens holding frame 212 may be used to hold the lens 210. The pin 214 provided in the lens holding frame 212 may be engaged with a cam groove of the cam ring 260. The cam ring 260 may move the pin 214 along the cam groove via self-rotation, so that the lens 210 is able to move together with the lens holding frame 212 along the optical axis direction. The plurality of lenses 210 may be able to achieve the functions of zoom lens, focal-length variable lens, and focusing lens. At least a portion or all of the plurality of lenses 210 may be configured to be movable along the optical axis.

The gear part 240 may transmit the power of the motor 231 and the motor 232 to the cam ring 260. The cam ring 260 may receive the power transmitted from the motor 231 and the motor 232 via the gear part 240, and may rotate around the optical axis. The motor 231 and the motor 232 may be direct-current (DC) motors. The motor 231 and the motor 232 may be brush DC motors or brushless DC motors. The designed electrical characteristics of the motor 231 may be the same as the designed electrical characteristics of the motor 232. When the current inputted to the motor 231 is the same as the current inputted into the motor 232, the rotation speed of the motor 231 can be substantially the same as the rotation speed of the motor 232. The model of the motor 231 may be the same as the model of the motor 232. That is, the motor 231 and the motor 232 may be of the same type. In one embodiment, the motor 231 and the motor 232 may be an exemplary first motor and an exemplary second motor, respectively.

The motor 231 and the motor 232 may transmit electric power to the cam ring 260 via the gear part 240, such that the cam ring 260 may rotate. The detector 270 may detect the rotation speed of one of the motor 231 and the motor 232. The detector 270 may include, for example, a photo-interrupter. A set of input terminals of the motor 231 and a set of input terminals of the motor 232 may be parallelly connected to a set of output terminals of the power supply 140 via a set of leads 224. Electric power from the power supply 140 may be provided to the motor 231 and the motor 232 via the set of leads 224. The input terminal on a first pole (for example, a positive pole) side of the motor 231 and the input terminal on a first pole side of the motor 232 can be electrically connected to the output terminal on a first pole side of the power supply 140. The input terminal on a second pole (for example, a negative pole) side of the motor 231 and the input terminal on a second pole side of the motor 232 can be electrically connected to the output terminal on a second pole side of the power supply 140.

The lens controller 220 may control the power supplied from the power supply 140 to the motor 231 and the motor 232 via the set of leads 224 based on the rotation speed detected by the detector 270. The lens controller 220 may drive the motor 231 and the motor 232, according to a lens control command from the camera part 102, to move one or a plurality of lenses 210 in the direction of the optical axis through the gear part 240 and the cam ring 260. The lens control command may include, for example, a zoom control command and a focus control command. The lens controller 220 may perform at least one of a zooming operation or a focusing operation by moving at least one of the lenses 210 along the optical axis. When performing, for example, the autofocus operation during a dynamic imaging process, the lens controller 220 may control the motor 231 and the motor 232 so that the cam ring 260 may rotate back and forth in a small range along the first rotation direction and the second rotation direction. By driving the focusing lens to rotate back and forth in a small range, the lens controller 220 may be able to take a swing action. In one embodiment, the swing action may refer to an action of calculating an evaluation value indicating the degree of blur of an image, such as a contrast value, etc., while slightly vibrating the focusing lens along the optical axis, and then determining the direction to move along the optical axis and gradually approaching the in-focus state. The lens controller 220 may be an exemplary controller. The lens controller 220 may take a swing action according to an autofocus command from the camera part 102.

In one embodiment, the memory 222 may store control values of the plurality of lenses 210. The memory 222 may include at least one flash memory such as SRAM, DRAM, EPROM, EEPROM, USB memory, etc.

In practical applications, the lens 210 may need to be large in order to improve the optical performance. For example, when the lens device 200 is a lens device used in a so-called medium-sized-image camera, etc., the lens 210 included in the lens device 200 may be large. As such, when the lens 210 is large, the lens 210 may become heavy. Therefore, in order to drive a heavy focusing lens to rotate back and forth in a small range through a swing action, the motor may need to generate a large torque.

Figure 2:
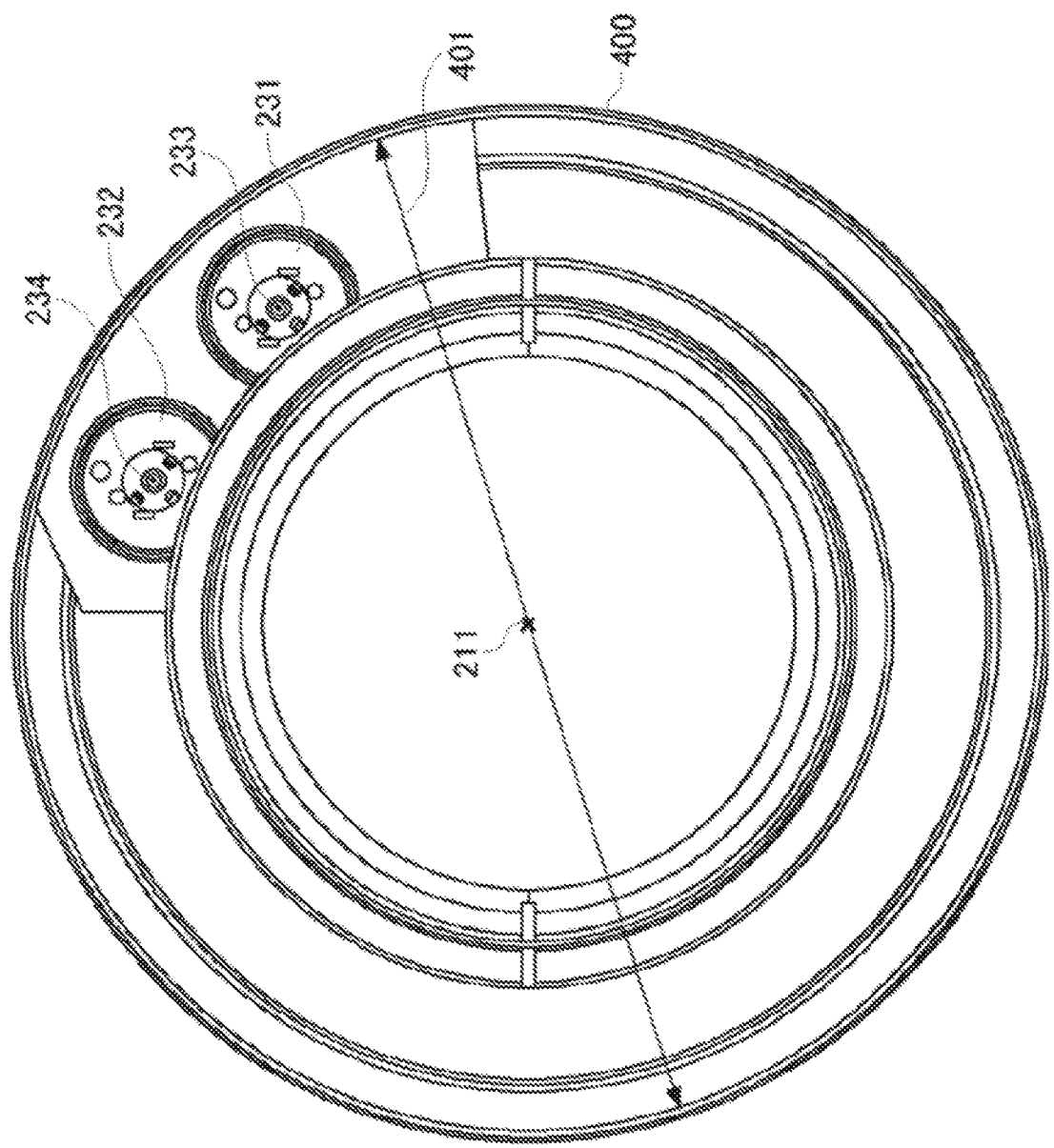
FIG. 2 illustrates a schematic diagram of an exemplary motor arrangement according to an embodiment of the present disclosure.
Figure 3:
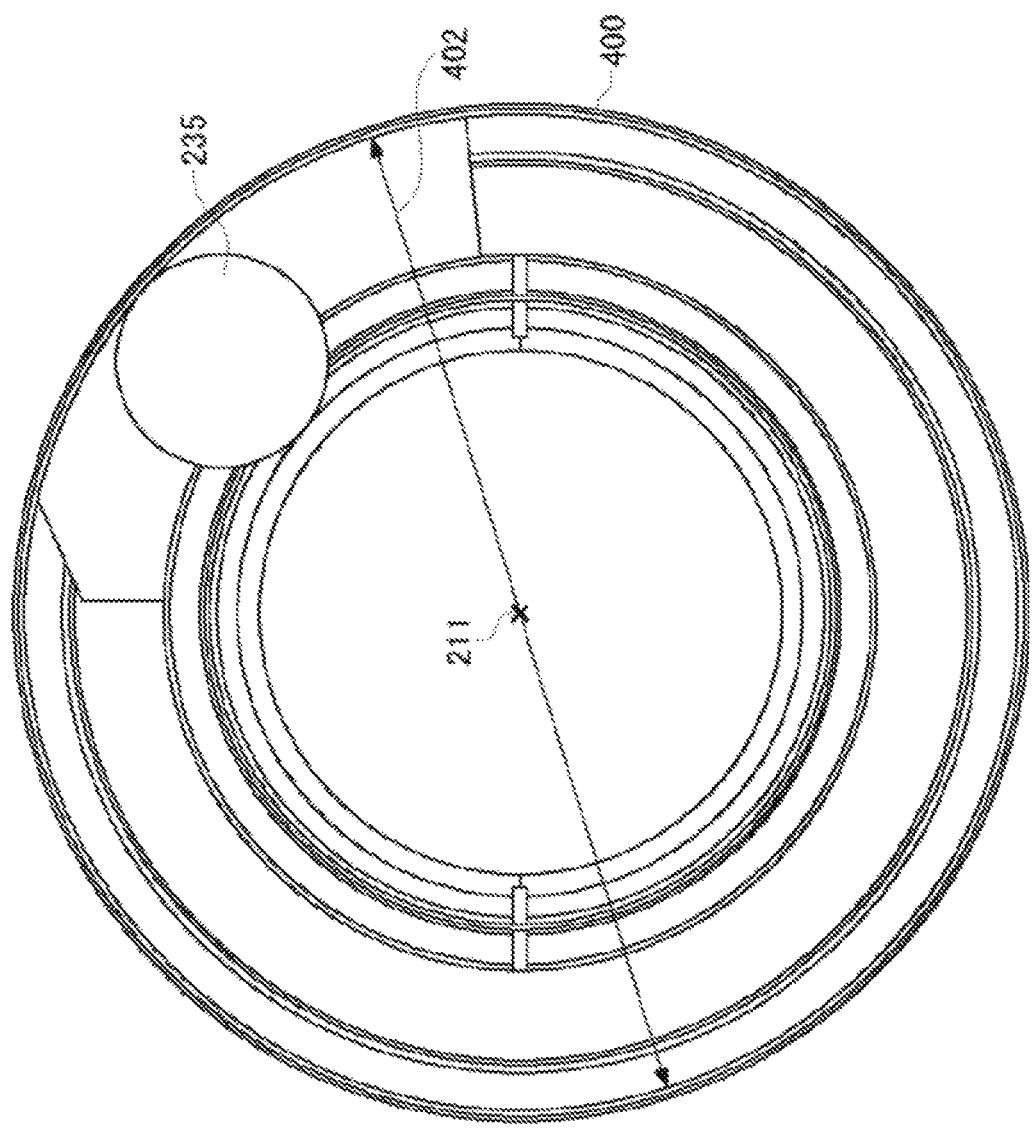
FIG. 3 illustrates a schematic diagram of another exemplary motor arrangement according to an embodiment of the present disclosure.

In one embodiment, when the torque required to drive one or more large lenses 210 is generated by one motor, the motor may be large. When the size of the motor is increased, the size of the lens tube accommodating the lens 210 may also be increased. Therefore, according to the lens device 200 in the present example, the cam ring 260 may be driven by the two motors, e.g. the motor 231 and the motor 232. As such, the torque needs to be generated by one motor may be reduced, and thus an increase in the size of the motor may be avoided. For example, the lens-tube diameter 401 of the lens tube 400 where the two motors having a smaller diameter, e.g. the motor 231 and the motor 232, are arranged as shown in FIG. 2 can be made smaller than the lens-tube diameter 402 of the lens tube 400 where a motor 235 having a larger diameter is arranged as shown in FIG. 3.

Further, when the torque is generated by two electric motors, the total torque may be increased as compared with the torque generated by one motor. When the torque is increased, the reduction ratio of the gear part 240 can be reduced. In other words, the number of gears constituting the gear part 240 may be reduced while any increase in size of the motor is avoided. By reducing the number of gears, energy loss can be suppressed. Further, by reducing the number of gears, the noise of the gear part 240 may be reduced. Moreover, by reducing the number of gears, the impact of the backlash can be reduced.

Figure 4:
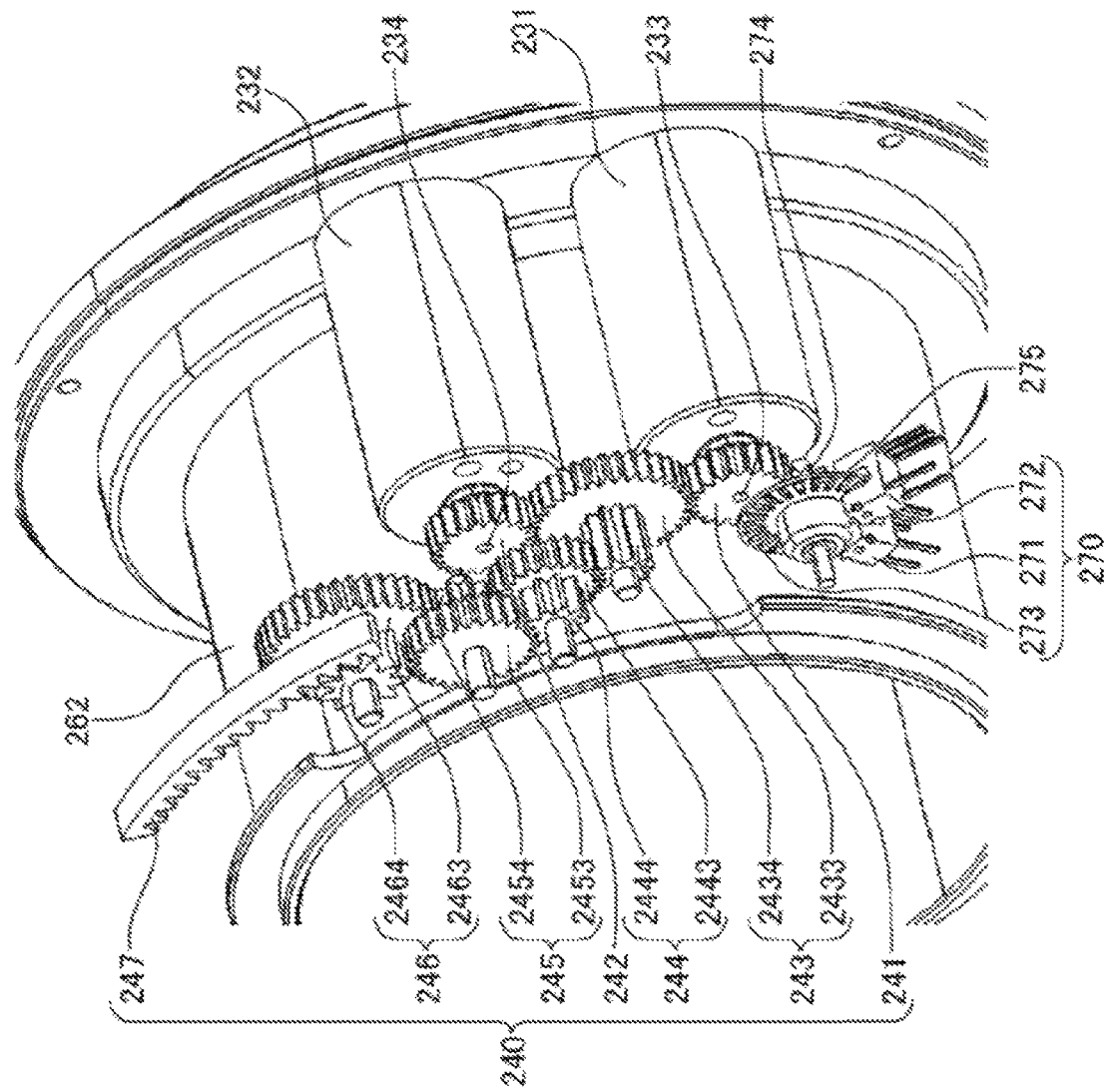
FIG. 4 illustrates a schematic gear configuration diagram of an exemplary gear according to an embodiment of the present disclosure.

FIG. 4 illustrates a schematic gear configuration diagram of an exemplary gear according to an embodiment of the present disclosure. Referring to FIG. 4, the gear part 240, the motor 231, and the motor 232 may be disposed along the outer peripheral surface of a fixed cylinder 262 of the lens device 200. The gear part 240 may include a gear 241 that is coupled to a drive shaft 233 of the motor 231. The gear 241 may be an exemplary first gear. The gear part 240 may include a gear 242 that is coupled to a drive shaft 234 of the motor 232. The gear 242 may be an exemplary second gear. The gear 241 and the gear 242 may be spur gears.

The lens device 200 may include a detector 270 that detects the rotation of the gear 241. The detector 270 may include a photo-interrupter 271, a photo-interrupter 272, and a grating disk 273. The grating disk 273 may have a gear 274 that meshes with the gear 241. The grating disk 273 may rotate in response to the rotation of the drive shaft 233 of the motor 231. The grating disk 273 may include slits 275 that are radially spaced apart. The photo-interrupter 271 and the photo-interrupter 272 may include a light emitting unit and a light receiving unit. A grating disk 273 may be disposed between the light emitting unit and the light receiving unit. The light emitted from the light-emitting unit may be received by the light-receiving unit via the slits 275, and the amount of rotation of the motor 231 may be determined based on the light-receiving pattern.

A gear 243 may mesh with the gear 241 that is connected to the drive shaft 233 of the motor 231 and a gear 242 that is connected to the drive shaft 234 of the motor 232. As such, the rotation speed of the gear 241 and the rotation speed of the gear 242 may be substantially the same. Therefore, the lens controller 220 may be able to control the driving of the motor 231 and the motor 232 based on the amount of rotation of the motor 231 detected by the detecting unit 270. The motor 231 and the motor 232 may be connected to the lens controller 220 via a set of leads, and the currents inputted from the lens controller 220 to the motor 231 and the motor 232 may be the same.

The lens controller 220 may regard the motor 231 and the motor 232 as one motor, and control the current inputted and the voltage applied to the motor 231 and the motor 232 based on the rotation speed detected by the detector 270. The current and voltage inputted to the motor 231 may be the same as the current and voltage inputted to the motor 232. Further, the detector 270 may be able to detect the rotation of the gear 242 that is connected to the drive shaft 234 of the motor 232. The detector 270 may also be able to detect the rotation of the gear 243 that meshes with the gear 241 and the gear 242.

In one embodiment, the gear part 240 may further include the gear 243 that meshes with the gear 241 and the gear 242. The gear 243 may be an exemplary third gear. The power of the motor 231 and the motor 232 may be transmitted to the cam ring 260 via the gear 243. The gear 243 may be a two-stage gear having a large gear 2433 that meshes with the gear 241 and the gear 242 and a small gear 2434 that is a secondary gear and has a smaller number of teeth than the large gear 2433. The large gear 2433 may be an exemplary fourth gear, and the gear 2434 may be an exemplary fifth gear.

The gear part 240 may also include a gear 244, a gear 245, and a gear 246. The gear 244 may be a two-stage gear having a large gear 2443 that meshes with the pinion 2434 and a small gear 2444 that is a secondary gear and has a smaller number of teeth than the large gear 2443. The gear 244 may be an exemplary sixth gear.

The gear 245 may be a two-stage gear having a large gear 2453 that meshes with the small gear 2444 and a small 2454 that is a secondary gear and has a smaller number of teeth than the large gear 2453. The gear 246 may be a two-stage gear having a large gear 2463 that meshes with the small gear 2454 and a small gear 2464 that is a secondary gear and has a smaller number of teeth than the large gear 2463.

In one embodiment, the gear part 240 may further include a gear 247 that is disposed on the cam ring 260 and meshes with the small gear 2464. The gear 247 may be mounted inside the cam ring 260, and may be an exemplary seventh gear. The power from the motor 231 and the motor 232 may be transmitted toward the cam ring 260 via the gear 241, the gear 242, the gear 243, the gear 244, the gear 245, the gear 246, and the gear 247.

As shown in FIG. 2, the drive shaft 233 of the motor 231 and the drive shaft 234 of the motor 232 may be disposed on a same circumference centered at the optical axis 211. With this configuration, the lens-tube diameter 401 of the lens tube 400 accommodating the lens 210 can be reduced.

Figure 5:
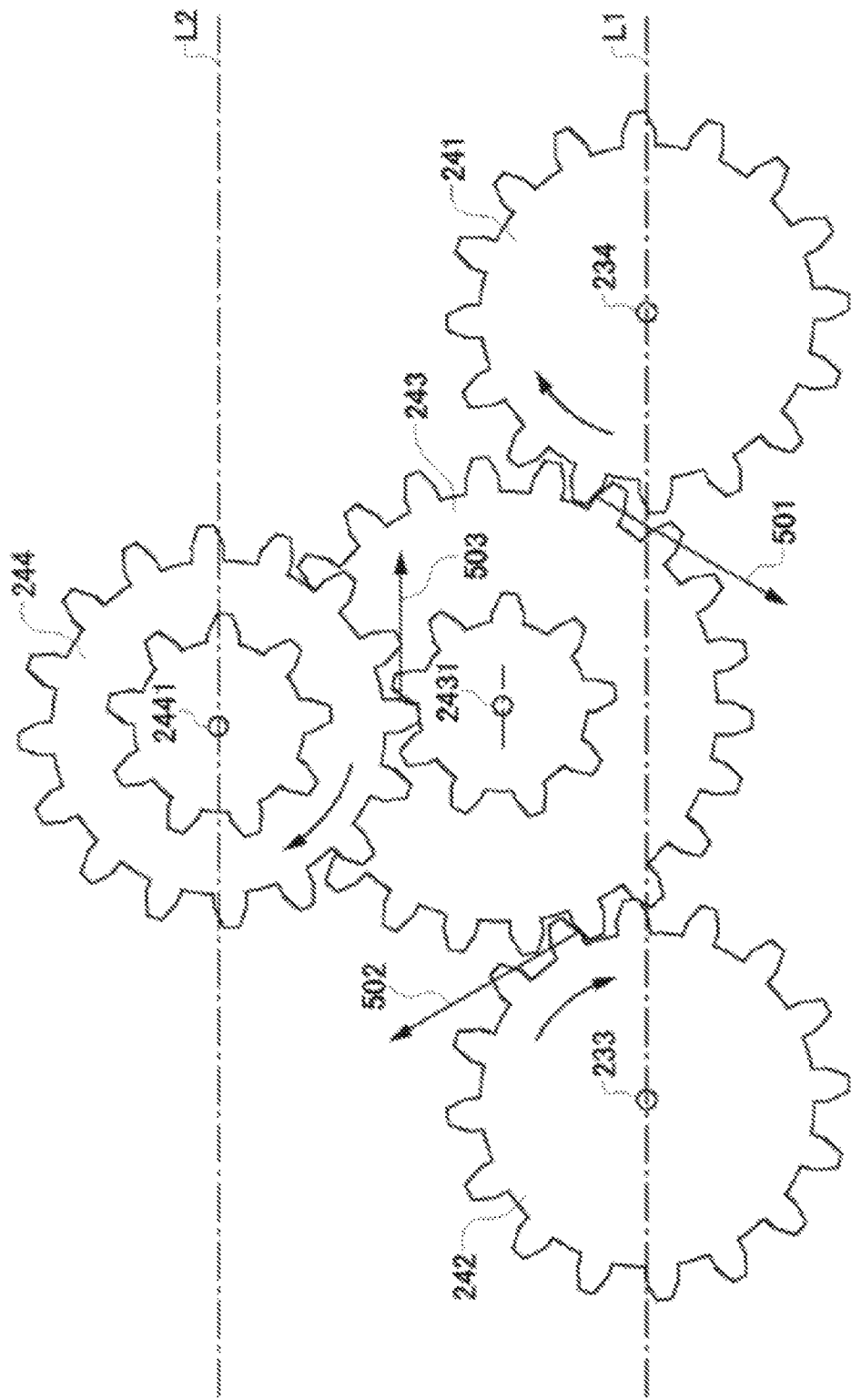
FIG. 5 illustrates a schematic diagram of an exemplary gear arrangement according to an embodiment of the present disclosure.

When rotating, a gear meshing with the other gears may generate a resistance force in a direction orthogonal to the rotation axis of the gear. The resistance force may lead to energy loss, and thus it may be necessary to cancel the resistance force out. For example, as shown in FIG. 5, when the gear 241 and the gear 242 rotate clockwise, a resistance force 501 may be generated between the gear 241 and the gear 243, and a resistance force 502 may be generated between the gear 242 and the gear 243. Therefore, a resistance force 503 generated between the gear 243 and the gear 244 may need to have a component in a direction opposite to the direction of the combined force of the resistance force 501 and the resistance force 502. As such, the resistance forces between different gears may cancel each other, and thus the energy loss may be suppressed.

The shaft center 2431 of the gear 243 may be disposed between a first straight line L1 that passes through the shaft center (the drive shaft 234) of the gear 241 and the shaft center (the drive shaft 233) of the gear 242, and a second straight line L2 that is parallel to the first straight line L1 and passes through the shaft center 2441 of the gear 244. Therefore, by arranging the gear 241, the gear 242, the gear 243, and the gear 244 in the way described above, the resistance forces between different gears may cancel each other out, and the energy loss may be suppressed. Further, the shaft center of a gear is a concept that also includes the rotating shaft of the gear. That is, the shaft center of a gear is also the rotating center of the gear.

Figure 6:
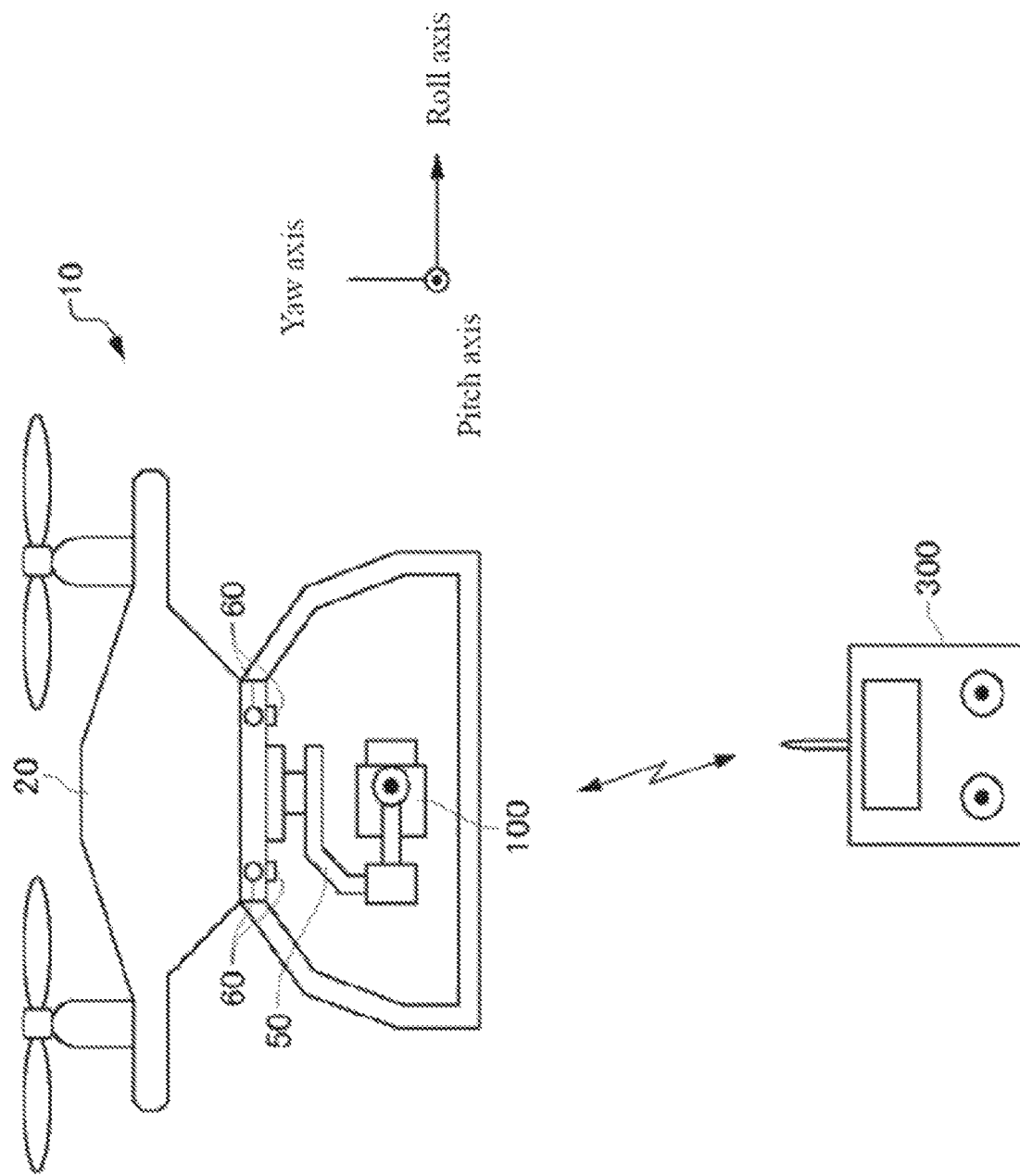
FIG. 6 illustrates a schematic diagram of an exemplary outward appearance of an unmanned aerial vehicle and a remote operation device according to an embodiment of the present disclosure.

The camera device 100 described above may be mounted on a moving body. The camera device 100 may be mounted on an unmanned aerial vehicle (UAV) as shown in FIG. 6. The UAV 10 may include a UAV fuselage 20, a universal joint 50, a plurality of camera devices 60, and a camera device 100. The universal joint 50 and the camera device 100 may be an exemplary camera system. The UAV 10 may be an exemplary moving body propelled by a propulsion unit. In addition to the UAV, the moving body may also include concepts of flying objects that move in the air, such as other aircrafts, etc., vehicles that move on the ground, and ships that move on the water.

The UAV fuselage 20 may include a plurality of rotating wings. The plurality of rotating wings may be an example of the propulsion unit. The UAV fuselage 20 may control the rotation of the plurality of rotary wings to lift the UAV 10. In one embodiment, the UAV fuselage 20 may use, for example, four rotary wings to lift the UAV 10. However, the number of rotating wings is not limited to four. In addition, the UAV 10 can also be a fixed-wing aircraft without a rotating wing.

The camera device 100 may be a camera for photographing a subject included in a desired imaging range. The universal joint 50 may be able to provide rotatable support to the camera device 100. That is, the direction of the support that the universal joint 50 provides to the camera device 100 may be adjustable. The universal joint 50 may be an exemplary support system. For example, in one embodiment, the universal joint 50 may employ an actuator to provide rotatable support to the camera device 100 around a pitch axis. In other embodiments, the universal joint 50 may employ an actuator to provide rotatable support to the camera device 100 around a roll axis and a yaw axis, respectively. The universal joint 50 may be able to change the attitude of the camera device 100 by rotating the camera device 100 around at least one of the yaw axis, the pitch axis, or the roll axis.

The plurality of camera devices 60 may be a plurality of sensing cameras for imaging the surrounding environment of the UAV 10 in order to control the flight of the UAV 10. For example, two camera devices 60 may be installed on the front side of the UAV 10. In addition, another two camera devices 60 may also be installed on the bottom surface of the UAV 10.

The two camera devices 60 disposed on the front side may be paired up and may be used as a so-called stereo camera. The two camera devices 60 disposed on the bottom side may also be paired-up and used as the so-called stereo camera. Based on the images captured by the plurality of camera devices 60, three-dimensional spatial data around the UAV 10 may be generated. As long as the UAV 10 includes at least one camera device 60, the number of camera devices 60 in the UAV 10 may not be limited to 4. In one embodiment, the UAV 10 may include at least one camera device 60 on each of the nose, tail, side, bottom, and top of the UAV 10. The range of the view angle that can be set for the camera device 60 may be wider than the range of the view angle that can be set for the camera device 100. In one embodiment, the camera device 60 may include a single-focus lens or a fisheye lens.

In one embodiment, a remote operation device 300 may communicate with the UAV 10 and may perform a remote operation on the UAV 10. The remote operation device 300 may be able to wirelessly communicate with the UAV 10. The remote operation device 300 may send instruction information to the UAV 10 to indicating the various instructions that are related to the movement of the UAV 10 such as ascent, descent, acceleration, deceleration, forward, backward, rotation, etc. The instruction information may include, for example, instruction information for raising the height of the UAV 10. The indication information may indicate the height at which the UAV 10 should be located. The UAV 10 may move to the height indicated by the instruction information that is received from the remote operation device 300. The instruction information may include a raising instruction to raise the UAV 10. The UAV 10 may rise when receiving the raising instruction. In one embodiment, after the height of the UAV 10 reaches the upper limit, raising of the UAV 10 may be restricted even when the UAV 10 receives a raising instruction.

As described above, although various embodiments of the present disclosure were provided for illustration, the technical scope of the present disclosure may not be limited to the range in the embodiments described above. Those skilled in the art should understand that the technical solutions described in the above embodiments may be modified, or part or all of the technical features may be equivalently replaced; and the modifications or substitutions do not depart from the scope of the technical solutions of the embodiments of the present disclosure.

It should be noted that the execution order of the processes such as actions, sequences, steps, and stages in the devices, systems, programs, and methods described in the claims, the description, and the drawings is not specifically stated as "previously", "before", etc., as long as the output of the previous processing is not used in the subsequent processing, it can be implemented in any order. Further, even terms such as "first", "next", etc. are used when describing the operation flow in the claims, the description, and the drawings, it does not necessarily mean that the operation must be performed in the specific order.

What is claimed is:

1. A lens device, comprising:
   a first motor and a second motor;
   a lens;
   a cam ring, configured to, in cooperation with the first motor and the second motor, drive the lens to move in a direction along an optical axis of the lens; and
   a gear part, configured to transmit a power of both the first motor and the second motor to the cam ring; wherein:
   both the first motor and the second motor drive the gear part to move the lens along an optical axis; and
   the gear part comprises:
      a first gear connected to a first drive shaft of the first motor;
      a second gear connected to a second drive shaft of the second motor; and
      a third gear meshing with the first gear and the second gear;
         the power of the first motor and the second motor being transmitted to the cam ring via the third gear.

2. The lens device according to claim 1, wherein:
   the third gear is a secondary gear including a fourth gear that meshes with the first gear and the second gear and a fifth gear having less teeth than the fourth gear; and
   the gear part further includes a sixth gear meshing with the fifth gear.

3. The lens device according to claim 2, wherein:
   a rotation axis of the third gear is disposed between a first line, which passes through a rotation axis of the first gear and a rotation axis of the second gear, and a second line, which is parallel to the first line and passes through a rotation axis of the sixth gear.

4. The lens device according to claim 2, wherein:
   the gear part further includes a seventh gear, disposed on the cam ring and transmitting the power of the first motor and the second motor via the sixth gear.

5. The lens device according to claim 1, wherein:
the first drive shaft and the second drive shaft are disposed on a same circumference centered at the optical axis of the lens.

6. The lens device according to claim 1, wherein:
designed electrical characteristics of the first motor are same as designed electrical characteristics of the second motor.

7. The lens device according to claim 1, wherein:
a model of the first motor is identical to a model of the second motor.

8. The lens device according to claim 1, wherein:
the first motor and the second motor are both direct-current (DC) motors.

9. The lens device according to claim 1, wherein:
a set of input terminals of the first motor and a set of input terminals of the second motor are parallelly connected to a set of output terminals of a power supply through a set of leads; and
power is provided from the power supply to the first motor and the second motor through the set of leads.

10. The lens device according to claim 9, further including:
a detector, configured to detect a rotation speed of one of the first motor and the second motor; and
a controller, configured to control, based on the rotation speed, the power provided from the power supply to the first motor and the second motor through the set of leads.

11. The lens device according to claim 10, wherein:
the detector includes a grating disk configured to rotate in response to a rotation of one of a first drive shaft of the first motor and a second drive shaft of the second motor; and
a photo-interrupter is configured to detect the rotation of the grating disk.

12. The lens device according to claim 1, wherein:
the lens is a focusing lens.

13. The lens device according to claim 1, wherein:
each of the first gear and the second gear includes a spur gear.

14. The lens device according to claim 13, wherein:
a set of input terminals of the first motor and a set of input terminals of the second motor are parallelly connected to a set of output terminals of a power supply through a set of leads; and
power is provided from the power supply to the first motor and the second motor through the set of leads.

15. The lens device according to claim 14, wherein:
a detector, configured to detect a rotation speed of one of the first motor and the second motor; and
a controller, configured to control, based on the rotation speed, the power provided from the power supply to the first motor and the second motor through the set of the leads.

16. The lens device according to claim 15, wherein:
the detector includes a grating disk configured to rotate in response to a rotation of one of a first drive shaft and the first motor and a second drive shaft of the second motor; and
a photo-interrupter is configured to detect the rotation of the grating disk.

17. A camera device, comprising:
a lens device, comprising:
a first motor and a second motor;
a lens;
a cam ring, configured to, in cooperation with the first motor and the second motor, drive the lens to move in a direction along an optical axis of the lens; and
a gear part, configured to transmit power of both the first motor and the second motor to the cam ring;
wherein:
both the first motor and the second motor drive the gear part to move the lens along an optical axis; and
the gear part comprises:
a first gear connected to a first drive shaft of the first motor;
a second gear connected to a second drive shaft of the second motor; and
a third gear meshing with the first gear and the second gear;
the power of the first motor and the second motor being transmitted to the cam ring via the third gear; and
a camera part, configured to take an image for light imaged by the lens device.

18. The camera device according to claim 17, wherein:
a set of input terminals of the first motor and a set of input terminals of the second motor are parallelly connected to a set of output terminals of a power supply through a set of leads;
a detector, configured to detect a rotation speed of one of the first motor and the second motor, wherein the detector includes a grating disk configured to rotate in response to a rotation of one of a first drive shaft of the first motor and a second drive shaft of the second motor;
a controller, configured to control, based on the rotation speed, the power provided from the power supply to the first motor and the second motor through the set of leads; and
power is provided from the power supply to the first motor and the second motor through the set of leads.

* * * * *